(12) United States Patent
Gurin et al.

(10) Patent No.: US 12,684,031 B2
(45) Date of Patent: Jul. 14, 2026

(54) SYSTEM AND METHOD FOR APPLICATION INTEGRATION BASED ON DECLARATIVE CALLBACK CONFIGURATION

(71) Applicant: Acronis International GmbH, Schaffhausen (CH)

(72) Inventors: Petr Gurin, Cracow (PL); Ivan Kukhta, Istanbul (TR); Marina Smolyanaya, Sofia (BG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 156 days.

(21) Appl. No.: 18/615,066

(22) Filed: Mar. 25, 2024

(65) Prior Publication Data
US 2025/0301034 A1 Sep. 25, 2025

(51) Int. Cl.
| | |
|---|---|
| *H04L 67/02* | (2022.01) |
| *G06F 9/34* | (2018.01) |
| *G06F 9/44* | (2018.01) |
| *G06F 9/54* | (2006.01) |
| *G06F 15/173* | (2006.01) |
| *H04L 9/32* | (2006.01) |
| *H04L 12/24* | (2006.01) |
| *H04L 15/16* | (2006.01) |
| *H04L 29/08* | (2006.01) |
| *H04L 67/10* | (2022.01) |

(52) U.S. Cl.
CPC .............. *H04L 67/02* (2013.01); *H04L 67/10* (2013.01)

(58) Field of Classification Search
CPC ................................. H04L 67/02; H04L 67/10
USPC .......................................................... 709/224
See application file for complete search history.

(56) References Cited

U.S. PATENT DOCUMENTS

| | | | |
|---|---|---|---|
| 7,941,510 | B1 | 5/2011 | Tormasov et al. |
| 8,850,060 | B1 | 9/2014 | Beloussov et al. |
| 10,187,322 | B1 * | 1/2019 | Kuzkin .............. G06Q 30/0613 |

(Continued)

FOREIGN PATENT DOCUMENTS

| | | |
|---|---|---|
| CN | 112532513 A | 3/2021 |
| CN | 114205191 A | 3/2022 |

(Continued)

*Primary Examiner* — Berhanu Shitayewoldetadik
(74) *Attorney, Agent, or Firm* — ESPE Legal Consultancy FZ-LLC

(57) ABSTRACT

Application integration within a cloud platform system based on declarative callback configuration including registering an application at a vendor portal module to acquire a unique vendor and application identification, declaring callbacks associated with application events, each with a callback type identifier and corresponding data structure, and initiating an API callback by a client module in response to an event, and forwarding the callback to an API Callback Gateway, which verifies the API callback for compliance, encapsulates it with authentication data, and transmits it to a designated callback handler within an ISV infrastructure, processing the callback by the handler, sending a structured response back to the Gateway, which validates and provides the response to a client module, and invoking the cloud platform API using the registered application identifier to trigger the API callback.

20 Claims, 5 Drawing Sheets

(56)          References Cited

U.S. PATENT DOCUMENTS

| | | | | |
|---|---|---|---|---|
| 10,970,048 | B2 | 4/2021 | Nelson et al. | |
| 12,341,893 | B2 * | 6/2025 | Sidduraj | H04L 9/3213 |
| 2003/0014521 | A1 * | 1/2003 | Elson | G06F 9/5011 |
| | | | | 709/225 |
| 2004/0221205 | A1 * | 11/2004 | Kozlov | G06F 11/0709 |
| | | | | 714/47.1 |
| 2005/0044089 | A1 * | 2/2005 | Wu | G06F 16/288 |
| 2005/0044530 | A1 * | 2/2005 | Novik | H04L 67/1095 |
| | | | | 717/122 |
| 2005/0125621 | A1 * | 6/2005 | Shah | G06F 16/284 |
| | | | | 711/173 |
| 2008/0059846 | A1 * | 3/2008 | Rosenthal | G06Q 40/04 |
| | | | | 714/E11.002 |
| 2012/0066363 | A1 * | 3/2012 | Somogyi | H04L 67/142 |
| | | | | 709/223 |
| 2013/0244632 | A1 * | 9/2013 | Spence | H04M 3/51 |
| | | | | 455/415 |
| 2014/0146959 | A1 * | 5/2014 | Spence | H04M 3/51 |
| | | | | 379/265.09 |
| 2015/0128293 | A1 * | 5/2015 | Hitomi | G06F 21/105 |
| | | | | 726/29 |
| 2020/0059401 | A1 * | 2/2020 | Holmes | H04L 41/0803 |
| 2023/0359513 | A1 | 11/2023 | Tummala et al. | |
| 2025/0047488 | A1 * | 2/2025 | Sidduraj | H04L 9/3242 |

FOREIGN PATENT DOCUMENTS

| | | | | |
|---|---|---|---|---|
| CN | 116302454 B | * 10/2023 | | G06F 9/485 |
| WO | WO-2020233012 A1 | 11/2020 | | |

* cited by examiner

300A

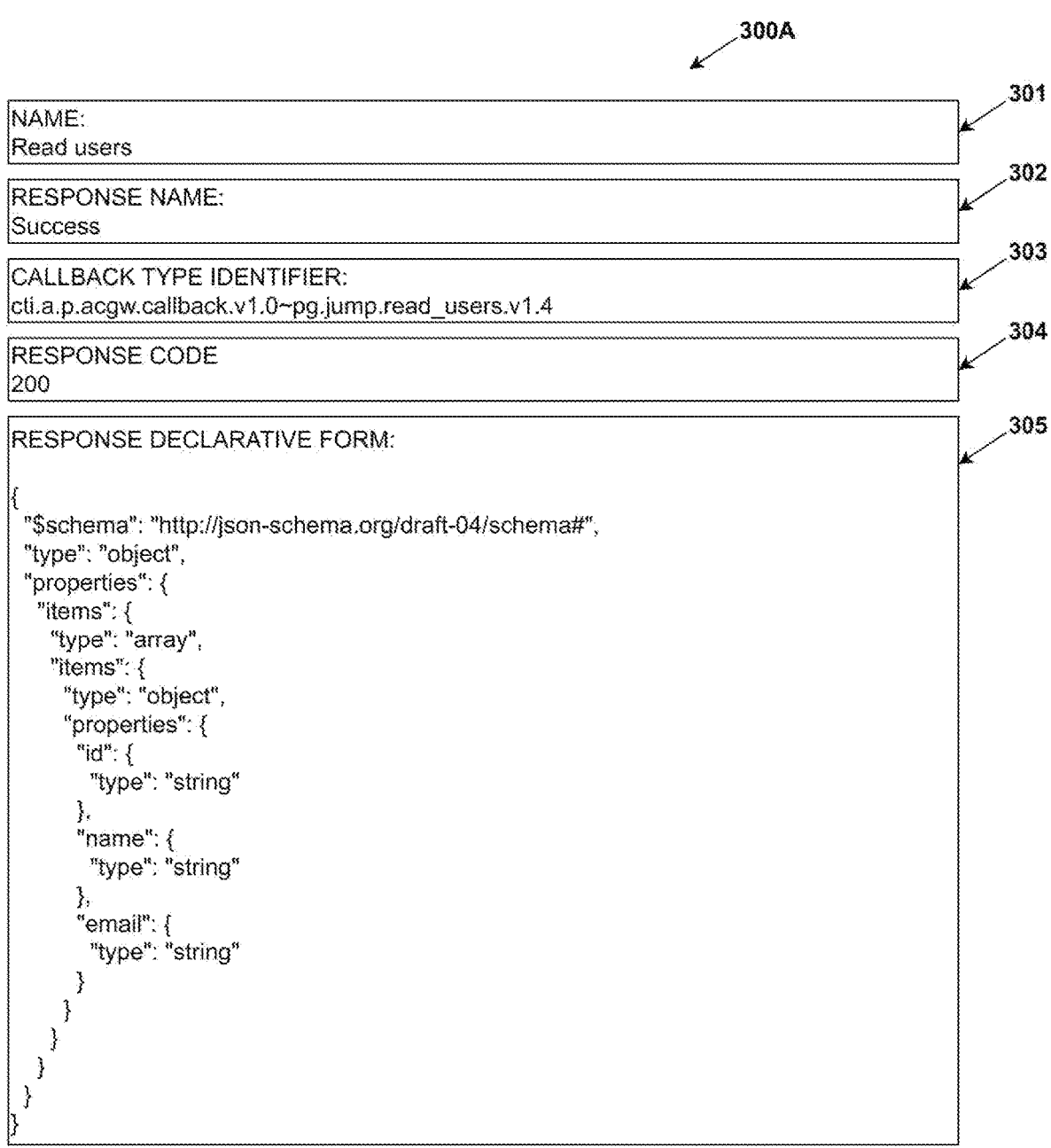

NAME:
Read users
— 301

RESPONSE NAME:
Success
— 302

CALLBACK TYPE IDENTIFIER:
cti.a.p.acgw.callback.v1.0~pg.jump.read_users.v1.4
— 303

RESPONSE CODE
200
— 304

RESPONSE DECLARATIVE FORM:

```
{
  "$schema": "http://json-schema.org/draft-04/schema#",
  "type": "object",
  "properties": {
    "items": {
      "type": "array",
      "items": {
        "type": "object",
        "properties": {
          "id": {
            "type": "string"
          },
          "name": {
            "type": "string"
          },
          "email": {
            "type": "string"
          }
        }
      }
    }
  }
}
```
— 305

NAME:
Reset password

311

REQUEST NAME:
Reset password

312

CALLBACK TYPE IDENTIFIER:
cti.a.p.acgw.callback.v1.0~pg.jump.reset_password.v1.4

313

REQUEST DECLARATIVE FORM:

```
{
  "$schema": "http://json-schema.org/draft-04/schema#",
  "type": "object",
  "properties": {
    "id": {
      "type": "string"
    }
  }
}
```

SYSTEM AND METHOD FOR APPLICATION INTEGRATION BASED ON DECLARATIVE CALLBACK CONFIGURATION

TECHNICAL FIELD

The invention relates generally to computer-implemented methods and systems for application integration and data exchange. More particularly, the invention relates to methods and systems for integrating applications based on declarative callback configurations, facilitating structured and secure data interactions between cloud environments.

BACKGROUND

In the field of digital platform integration, there is a growing need for seamless interaction between independent software vendors (ISVs) and various platform providers. Traditional systems for establishing such integrations require extensive research and development resources to facilitate a connection. However, each platform often employs a unique Application Programming Interface (API) with different authorization types and protocols, complicating the integration process.

A significant challenge arises when active platforms, which initiate requests to external APIs, must develop custom libraries to communicate with passive platforms that provide these APIs. Traditional systems attempting to bridge this gap often fail due to the divergence in endpoint configurations and the necessity for continuous maintenance of interaction contracts and backward compatibility.

Existing solutions cannot provide the necessary flexibility or ease of development, especially when passive platform vendors have a greater interest in the integration and are willing to develop it themselves. Thus, changes must be introduced on the active platform, which can be both time-consuming and costly.

Therefore, there is a need for improved methods and systems that can streamline the integration process, reduce the burden on research and development resources, and provide a more adaptable and cost-effective solution for digital platform integration.

SUMMARY

Embodiments described or otherwise contemplated herein substantially meet the aforementioned needs of the industry. Systems and methods provide a framework for cloud platform integration and data exchange through a callback gateway service. Systems and methods allow for the declarative configuration of API callbacks, enabling ISVs to specify and control data exchange requirements and protocols directly from a vendor portal in a cloud platform.

In an embodiment, a computer-implemented method for application integration within a cloud platform based on declarative callback configuration comprises registering, at a vendor portal module of the cloud platform, an application to acquire a unique vendor identification and a unique application identification, wherein the registration includes transmitting application-specific information to be stored within a metadata database of the vendor portal; declaring, at vendor portal module, a plurality of callbacks for the application, each callback being associated with at least one application event and comprising a callback type identifier (CTI) code and a corresponding data structure of the callback request and callback response; initiating, by a client module within the cloud platform, an application program interface (API) callback in response to a predetermined event; forwarding, from the client module to an API callback gateway of the cloud platform, the API callback, wherein the API callback gateway is configured to route the API callback based on the CTI code to a designated callback handler within an independent software vendor (ISV) infrastructure; verifying, at the API callback gateway, the API callback to ensure compliance with a predefined data structure and callback configuration; encapsulating, at the API callback gateway, the API callback with metadata; transmitting, from the API callback gateway to the designated callback handler at the ISV infrastructure, the encapsulated API callback, wherein the callback handler is configured to process the API request; processing, by the callback handler, the encapsulated API callback to perform an operation associated with the at least one application event within the ISV infrastructure based on the CTI code and the encapsulated authentication data; sending, from the callback handler back to the API callback gateway, a response to the API callback; validating, at the API callback gateway, the response from the callback handler against a JSON schema associated with the CTI code to confirm structural integrity and data accuracy; and providing, by the API callback gateway to the client module, verified response data from the ISV infrastructure, wherein the client module is adapted to utilize the verified data.

In an embodiment, a system for application integration within a cloud platform environment comprises a vendor portal configured to register an application thereby acquiring unique vendor and application identifiers, and to store application-specific information within a metadata database; a client module within the cloud platform configured to initiate an API callback in response to a predetermined event; an API callback gateway configured to: receive the initiated API callback from the client module, verify the API callback for compliance with predefined data structures and callback configurations, encapsulate the API callback with authentication data, and route the encapsulated API callback based on a callback type identifier to a designated callback handler within an ISV infrastructure; a callback handler deployed within the ISV infrastructure configured to: process the received encapsulated API callback, and send a structured response back to the API callback gateway; and wherein the API callback gateway is further configured to validate the structured response from the callback handler against a declared data structure and provide the validated response data to the client module, the client module further configured to utilize the validated response data according to the application.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3A is a form for declaring an API callback response, in accordance with an embodiment.

FIG. 3B is a form for declaring an API callback request, in accordance with an embodiment.

Figure 1:
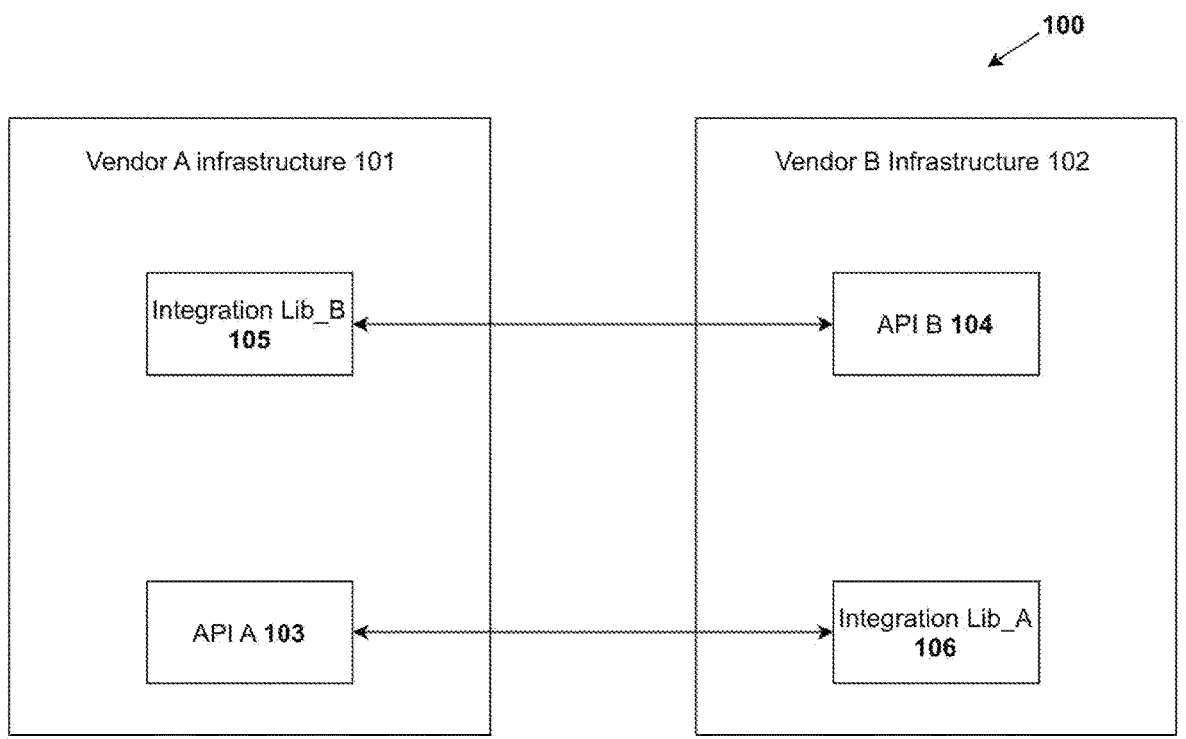
FIG. 1 is a block diagram of an application integration schema, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring to FIG. 1, an integration schema between Vendor A Infrastructure 101 and Vendor B Infrastructure 102, each leveraging their own APIs and integration libraries, is shown, in accordance with an embodiment. Vendor A infrastructure utilizes integration lib_B 105 to adapt its data formats and protocols to interface with API B 104 of vendor B. Conversely, vendor B employs integration lib_A 106 to communicate with API A 103 of Vendor A.

APIs 103, 104 can be implemented using different frameworks. REST (representational state transfer) API is a standard that utilizes HTTP requests to manage data, and is a flexible and efficient framework for web services. SOAP (simple object access protocol) is highly structured and provides robust transaction compliance, and GraphQL allows clients to request only specific data, reducing bandwidth and improving efficiency. Each framework comes with specific security protocols, data exchange formats, and operational methodologies, necessitating a careful approach to ensure system compatibility, data integrity, and secure authentication and authorization measures.

In a typical use case, Vendor B can develop an application designed to operate within vendor A infrastructure. The application sends and receives data payloads formatted to be compatible with API B 104 specification, using integration lib_B 105 to translate and transmit these payloads to and from Vendor A infrastructure. At the same time, applications must be compatible with API A 103 to use functionality of Vendor A infrastructure.

Security concerns in the disclosed integration model include ensuring that data transmitted between the APIs is encrypted and that proper authentication is enforced to prevent unauthorized access on both sides—in API A 103 and API B 104. Additionally, maintaining API backward compatibility is critical; as vendor B updates API B 104, it must ensure that integration Lib_A 106 can still communicate with newer versions without disrupting existing operations. The process of developing and deploying applications of one vendor in the infrastructure of a second vendor must resolve all specified concerns and issues—support APIs, infrastructure limitations, connectivity requirements, data format specifications that significantly complicates the process of developing, deploying and maintaining integrated applications.

Figure 2:
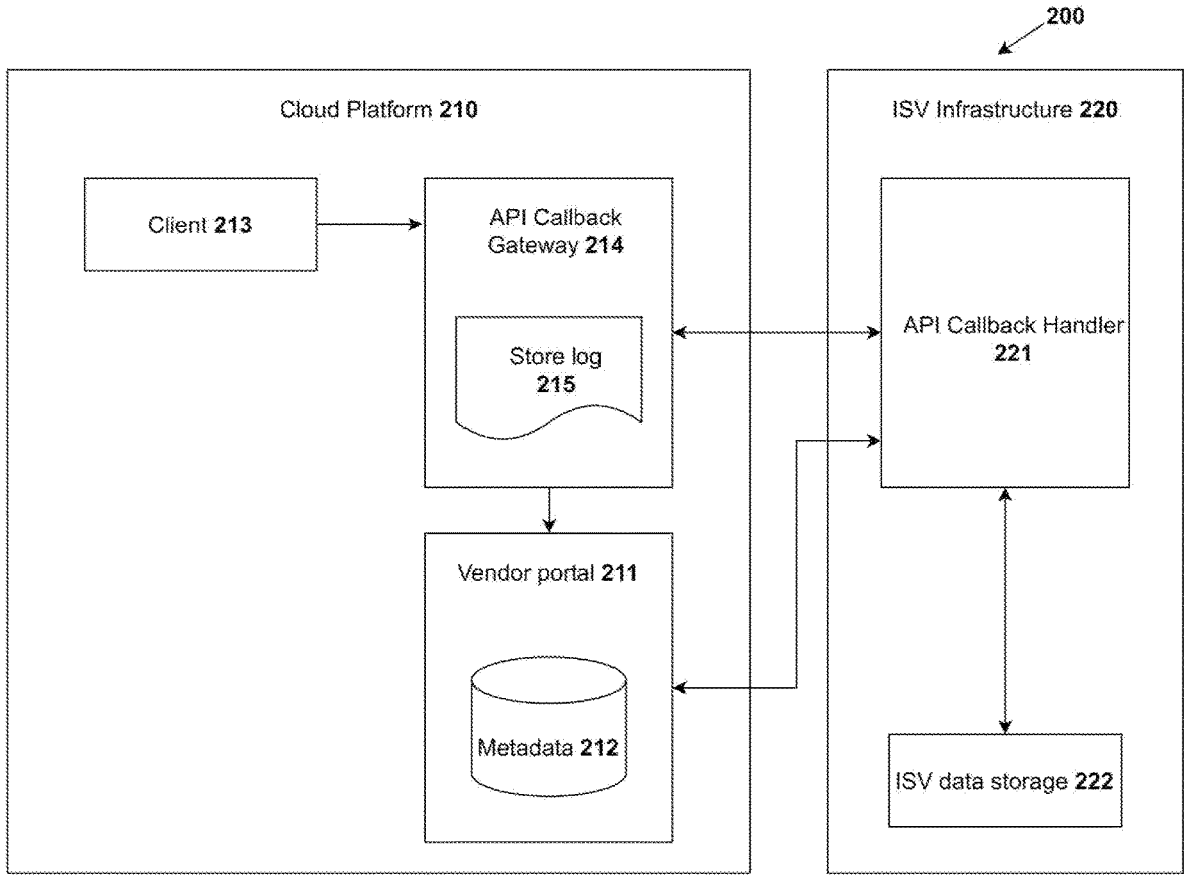
FIG. 2 is a block diagram of a system for application integration based on declarative callback configuration, in accordance with an embodiment.

Referring to FIG. 2, a system 200 for application integration based on declarative callback configuration is depicted. As illustrated in the system 200, an application is deployed within a cloud environment, referred to as cloud platform 210, and uses API callbacks to communicate with ISV infrastructure 220.

In an embodiment, the cloud platform 210 comprises computer system resources, including storage and computer processing resources. The cloud platform 210 can include components and functionality distributed over multiple locations and over multiple hardware components.

Cloud platform 210 generally comprises a client 213, an API callback gateway 214, and a vendor portal 211. The client 213 can comprise a service, graphical user interface, or script within the cloud platform 210. The API callback gateway 214 and vendor portal 211 incorporate diverse deployment options and sophisticated communication functionalities to facilitate seamless interactions with other system components. The API callback gateway 214 can be deployed across public, private, or hybrid cloud environments, using containerization with Docker or Kubernetes for scalability, microservices architecture for modularity, and serverless models for efficient, event-driven tasks. The API callback gateway 214 secures data exchanges with HTTPS and OAuth, handling data formatting with JSON or XML for system compatibility and stores all operational events in store log 215. The vendor portal 211, deployed via cloud-based web services or API management platforms, provides ISVs a centralized interface for callback management and configuration, storing all settings and temporal operational data in metadata 212.

In an embodiment, the ISV infrastructure 220 generally comprises an API callback handler 221 and an ISV data storage 222. The API callback handler 221 can be implemented as a service, application, or hardware server, and is configured for network communication capabilities, instructions for callback processing, and integration with other system components. This allows API callback handler 221 to interact effectively with ISV data storage 222 and other services, facilitating the processing of callback requests and responses. ISV data storage 222, according to an embodiment, encompasses various types of storage solutions such as databases, S3 storage, or RAID configurations. These storage options are selected based on the requirements for latency sensitivity, data volume, and persistence, ensuring efficient data management and retrieval in the context of callback processing.

In one embodiment of the system 200, an application within cloud platform 210 can be constructed utilizing a dedicated framework provided by the cloud platform 210 service. The framework allows the application to be developed using a set of predefined functional blocks, which can be customized according to the specific needs of the integration. The application leverages the framework libraries, which are designed to interact with the declared API callbacks, thereby simplifying the communication process with ISV data storage 222 within the ISV Infrastructure 220.

In another embodiment, the application is built using a codeless application constructor that is available within cloud platform 210. The constructor allows ISV developers to assemble the application by selecting and configuring standard functional blocks through a graphical user interface (GUI). These blocks are pre-programmed to respond to various triggers and events within the cloud platform, utilizing the declared API callbacks to interact with external ISV infrastructure 220.

Further, the application can employ specialized libraries that have been created based on the declared API callbacks and subsequently deployed within cloud platform 210. These libraries are tailored to convert the cloud platform 210 internal events into API callback requests, formatted according to the JSON schema defined within the vendor portal 211. The use of such libraries can abstract the complexity of API callback handling from the application logic, allowing developers to focus on the business logic and user experience aspects of the application.

An alternative approach involves the application using a hybrid model, where the application is partially built with the cloud platform 210 framework and partially with custom-developed modules that directly interact with the API callback gateway 214. The hybrid model provides flexibility for developers to leverage the best features of the cloud platform while also incorporating custom functionality that is unique to the application requirements.

In one embodiment, cloud platform 210 represents the foundational environment wherein application integration is facilitated. Client 213 initiates the process of application integration.

Vendor portal 211 operates as the configuration center, where the ISV developer registers and configures the application to be integrated within cloud platform 210. The ISV developer specifies the callback declarations, which include the request data format with corresponding callback type identifier (CTI) code and JSON schema, along with the response data format. These configurations are stored as metadata 212 within vendor portal 211, serving as the reference point for API callback processing.

In one embodiment, vendor portal 211 stores registered information of ISV applications to integrate with cloud platform 210. Upon registration, the vendor portal 211 captures and stores application details, vendor information, and associated callback declarations within metadata database 212. In one embodiment, the metadata database 212, configured to support the vendor portal 211, employs a structured schema to efficiently manage the relationship between callbacks, ISV applications, and vendors. The database includes tables for callbacks, applications, vendors, and callback-application-vendor associations. Each callback entry contains fields for identifiers, types, and configuration parameters. Application and vendor tables store respective details, including names, descriptions, and security credentials. Association tables link callbacks to specific applications and vendors, facilitating quick retrieval. This relational structure ensures that the metadata database 212 categorizes and preserves associations, supporting accurate retrieval and processing of API callbacks within the integration ecosystem. Further, registered data is used to grant access to applications, callback handlers and other parts of the system. Metadata in API callbacks is a set of data accompanying the payload of a primary request and response, which includes: information on the request like timestamps and identifiers, authorization details specifying access controls, operational context for stateful processing, custom properties for flexible callback handling, data enrichment for additional context, versioning information for compatibility, security enhancements for data integrity, or performance tracking metrics.

In another embodiment, declarations and metadata stored within metadata database 212 include detailed specifications such as callback types, data formats for requests and responses, and authentication parameters, which include corresponding CTI code and JSON schema. API callback declarations are anchored to the ISV application and vendor credentials, forming an integral part of the system configuration for API callbacks.

In yet another embodiment, vendor portal 211 enables selective sharing of callback declarations to promote crossvendor and cross-application integrations within cloud platform 210. Such sharing facilitates the utilization of declared API callbacks by different applications on the cloud platform 210, creating an interconnected ecosystem. Vendor portal 211 acts not solely as a configuration repository but also as a conduit for collaborative integration across various cloud services, according to an embodiment.

API callback gateway 214 operates as the callback proxy, receiving the API callbacks from client 213. API callback gateway 214 is tasked with the verification and encapsulation of API callbacks, ensuring compliance with the declared callback configurations stored in metadata database 212 and enriching with additional data for authentication, connection policy and other parameters that help to deliver the callback to ISV infrastructure 220. Encapsulation, as performed by the API callback gateway 214, involves wrapping the received API callbacks with additional layers of data and security measures before forwarding them to the ISV infrastructure 220. Furthermore, encapsulation enriches the callbacks with necessary authentication tokens, connection policies, and any other relevant parameters tailored to the requirements of the receiving ISV system. Store log 215 within API callback gateway 214 maintains a record of the transactions for auditing and troubleshooting purposes. In one embodiment, the store log 215 captures data across several fields: a unique Transaction ID for identification, Timestamp for chronological tracking, Callback Type to specify the callback involved, Request and Response Data detailing the exchange, Status to indicate success or failure, and Error Messages for diagnosing issues.

In an embodiment, the API callback gateway 214 performs a load balancing to optimize the distribution of incoming API callback requests among multiple callback handlers. In one embodiment, multiple API callback gateways 214 can be organized in hierarchical structure, forming a chain of transaction operation, where one API callback gateway 214 can route the callback to another API callback gateway 214 in cloud platform 210. In this case, API callback gateway 214 can control load balancing by forwarding a callback to another API callback depending on performance metrics. The callback allocation is predicated on evaluating the current load and performance metrics of each handler and/or gateway, ensuring that no single handler and/or gateway becomes overwhelmed, thereby maintaining high efficiency and responsiveness across the system. The load balancing mechanism functions by continuously monitoring the performance metrics of each callback handler and gateway, including but not limited to, processing speed, queue length, network traffic and error rates. Based on this real-time data, the mechanism dynamically adjusts the routing of incoming requests to balance the load evenly among available handlers and gateways. The information related to the structure of API callback gateways and API callback handlers, necessary for routing the API callback, are stored in the metadata database 212 as metadata.

In ISV infrastructure 220, the application deployed within cloud platform 210 interacts with ISV data storage 222. Such an interaction entails the application retrieving data or performing actions in response to events triggered within cloud platform 210. API callback handler 221 is not directly involved in the application deployment within cloud platform 210 but is instrumental in managing the communication with ISV data storage 222, facilitating a cohesive integration process according to an embodiment.

API callback handler 221 is configured to receive and process API callbacks from API callback gateway 214 in accordance with the vendor defined logic. Upon reception of the callback, API callback handler 221 executes data requests or initiates actions within the ISV infrastructure 220.

In one embodiment, API callback handler 221 can interact with a ISV data storage 222 to retrieve specific records or information in response to a data request from an application within cloud platform 210. API callback handler 221 can also activate a service that performs a designated operation, such as computing a complex algorithm or processing a transaction. The service executes the operation and returns the output or results to API callback handler 221, which in turn sends the response back to the client 213 through API Callback Gateway 214.

API Callback Handler 221 can communicate with various data storages 222, ensuring the execution of requests is consistent with the data structure and operational requirements stipulated by the ISV. Whether the payload is a command to fetch data or to trigger a service process, API callback handler 221 ensures secure and efficient execution, followed by a structured communication of the results back to the client, according to an embodiment. The system 200 provides a dynamic mechanism for application integration, wherein API callback handler 221 acts as an adaptable conduit, enabling robust interactions between cloud platform 210 and ISV infrastructure 220.

In one embodiment, cloud platform API operates as an interface of cloud platform 210, enabling various interactions between the cloud environment and ISV infrastructure 220. With registered information from vendor portal 211 stored in metadata database 212, cloud platform API requests can target specific applications within cloud platform 210, ensuring efficient management and response to both internal and external requests. For example, an ISV service can command cloud platform API 214 to read or post alerts, or retrieve tenant data from an application on cloud platform 210. Upon such requests, cloud platform API triggers an API callback to ISV infrastructure 220, establishing a cycle of interactions that sustains dynamic system operations in dual directions.

The system 200 provides a structured approach to integrating applications into cloud platforms 210, leveraging declarative callbacks to streamline interactions between the cloud environment and ISV services, referred to as data storage 222.

Referring to FIG. 3A, a form 300A for declaring an API callback response within a cloud platform is shown, according to an embodiment. The form 300 includes several fields, configured for the input of information related to API callback responses. The ISV developer inputs a callback declaration form to standardize callback operations and versioning in cloud platform 210 and ISV infrastructure 220. A use case for the API callback operation is specified where an application necessitates retrieving a list of users from the ISV data storage 222. To accommodate a requirement, an API callback must be declared, encompassing a response data structure in a defined form. The exemplified form illustrates a filled declaration that the API callback gateway 214 will utilize to verify the structural integrity of the callback and which the API callback handler will employ to procure and relay the data in the specified format. In an embodiment, the client will initiate an API callback using the corresponding callback CTI to request an array of user information. The structured data include distinct identifiers, names, and email addresses for each user. The form 300 includes a JSON schema that delineates the expected format of the response, ensuring that the data returned adheres to the precise requirements of the requesting client. A methodical approach to declaring API callback responses allows applications within cloud platform 210 to systematically retrieve information from ISV infrastructure 220, according to an embodiment.

In field 301, labeled "NAME", the form includes the name of the API callback, which in the current embodiment is "Read users". Name field 301 specifies the title of the callback operation that the cloud platform API gateway 214 will recognize and to which it will respond.

Field 302, denoted as "RESPONSE NAME", holds the descriptor of the callback response. In field 302 instance, the response name is "Success", indicating a successful operation or retrieval of data by the callback.

In field 303, identified as "CALLBACK TYPE IDENTIFIER", a unique identifier for the callback type is inputted. The provided example "cti.a.p.acgw.callback.v1.0~pg.jump.read_users.v1.4" serves as a reference for the API to ascertain the structure and nature of the callback response. The CTI is a structured reference employed by the system to identify and operate the API callback. The CTI comprises two distinct segments separated by the tilde "~" character, each serving a specific purpose within the callback operation framework. The first segment, "cti.a.p.acgw.callback.v1.0", acts as the cloud platform API callback descriptor. It signifies that the API callback is intended for operation by the API callback gateway 214 and API callback handlers 221 corresponding to the specified version. The descriptor ensures that the callback is routed and handled by the correct components within the cloud platform infrastructure capable of processing the callback according to its version requirements. The second segment following the tilde, "pg.jump.read_users.v1.4", provides a detailed identification of the callback itself. "PG" represents the vendor name, indicating the source or owner of the callback. "Jump" denotes the application name, specifying the particular application to which the callback is associated. "Read_users" is the name of the callback, describing the action or data retrieval process that the callback will initiate. Lastly, "v1.4" specifies the version of the callback, allowing for precise version control and compatibility checks during the callback operation. The general structure for the CTI can be outlined as follows: "[callback descriptor]~[vendor identifier].[application identifier].[callback name].[callback version]". Such a format provides a systematic approach to CTI construction, ensuring consistency and clarity in the API callback management process across the cloud platform, supporting a versioning mechanism and backward compatibility between applications, declared callbacks and ISV data storage 222, according to an embodiment.

Field 304, labeled "RESPONSE CODE", is intended for the entry of the response code associated with the API callback. The response code "200" typically signifies a successful HTTP request and response cycle.

Field 305, titled as "RESPONSE DECLARATIVE FORM", contains the JSON schema that outlines the structure of the callback response. The JSON schema demonstrates the expected format of the response payload, including fields such as "id", "name", and "email", each designated as a string type. Data schema ensures that the data returned by the API callback is structured correctly for use by the requesting client. Declaration of the API callback response is used for standardized communication and processing within the cloud platform API infrastructure. The form facilitates clear and consistent declaration of callback responses, enabling applications to integrate and interact with cloud platform services effectively, according to an embodiment.

Referring to FIG. 3B, a form 300B for declaring an API callback request within a cloud platform is shown, according to an embodiment. The example form 300B illustrates the utility of the API callback declaration in streamlining specific request operations, such as password reset.

In an embodiment, an application requires the reset of a password for a user identified by a unique "ID". Within the client interface, a "reset password" button is provided, which, upon activation, initiates an API call to the ISV data storage 222 to execute the password reset for the specified user. The API callback request, identified with the CTI, specifies that to reset a password, the application must supply the "id" field corresponding to the user. Upon the successful invocation of the API callback, the ISV data storage 222 processes the password reset request. The API callback gateway 214, utilizing the declared CTI, ensures the request adheres to the prescribed format. Subsequently, the ISV data storage 222 communicates the result of the operation, indicating success or failure through an appropriate response code, back to the client via the API callback handler 221.

Field 311, labeled "NAME", specifies the name of the API callback. In the current embodiment, the name is set as "Reset password", which indicates the operation that the API callback is designed to reset a password for a given user.

Field 312 "REQUEST NAME", specifies a request of the API callback. Request name is also described as "Reset password", matching the name of the API callback, but it can be different.

Field 313, labeled "CALLBACK TYPE IDENTIFIER", contains the unique identifier for the type of API callback. The identifier "cti.a.p.acgw.callback.v1.0~pg.jump.reset_password.v1.4" provides a clear reference for the system to process the request, indicating the version and specificity of the callback required by the API. According to an embodiment, the "reset_password" indicates that the API callback version "1.4" is used by the application "jump" of the vendor "pg" to request password reset.

Field 314, described as "REQUEST DECLARATIVE FORM", details the JSON schema that defines the structure of the request data for the API callback. In an example, the schema stipulates that the requested data will be an object containing an "id" of type "string". Data schema ensures the proper format of the request data when it is sent from the API callback initiator to the API callback handler.

Figure 4:
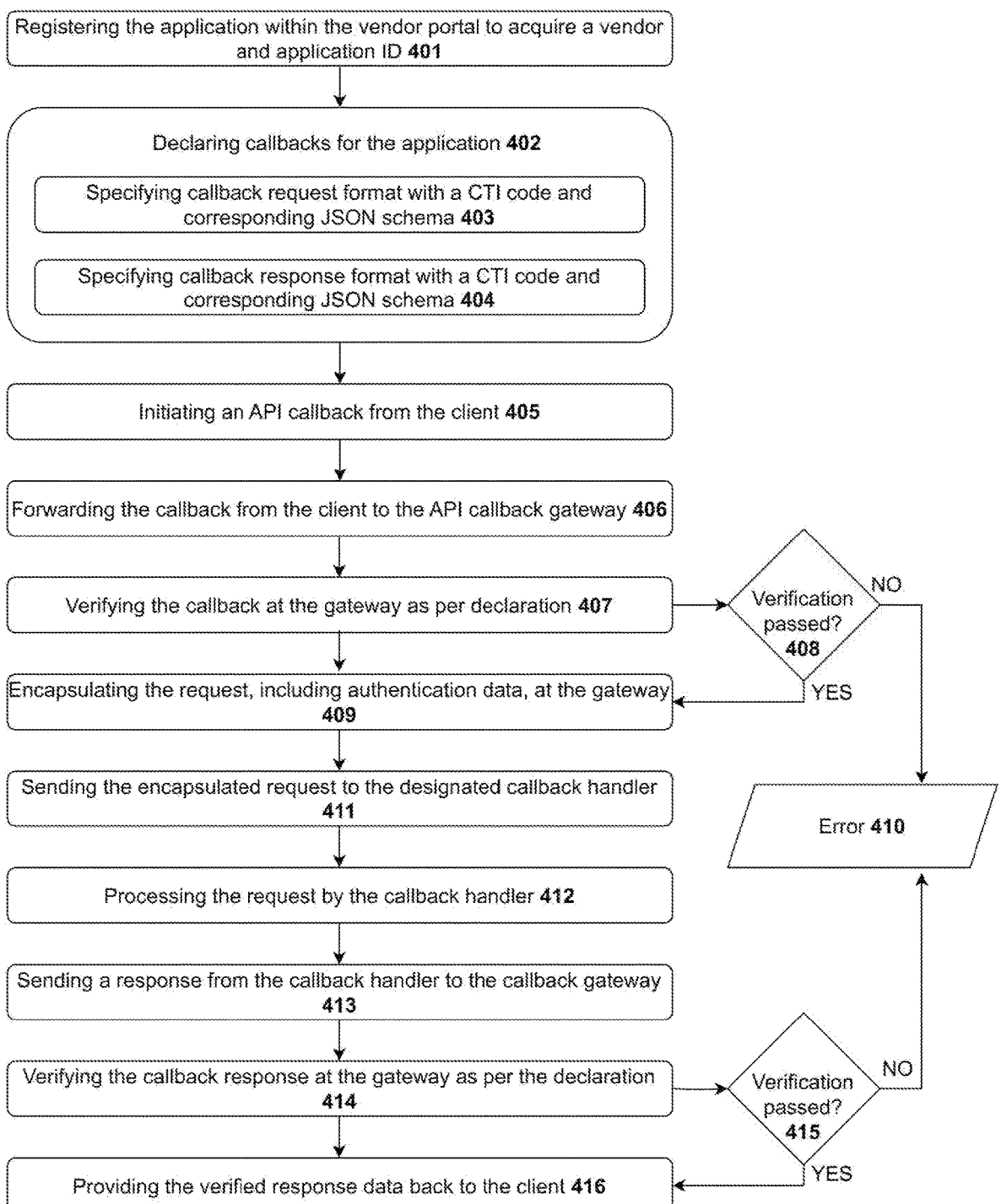
FIG. 4 is a flowchart of a method for application integration based on declarative callback configuration, in accordance with an embodiment.

Referring to FIG. 4, a flowchart of a method for application integration based on declarative callback configuration is depicted, including a sequence of operations for API callback procedures, according to one embodiment. The method includes both request and response phases within a declared data exchange framework.

At 401, the method initiates with the enrollment of an application within a vendor portal, which confers upon the vendor portal a unique vendor and application identifier. In one embodiment, the application enrollment within a cloud platform vendor portal is fortified by the utilization of unique identifiers, which are indispensable for the application's subsequent interactions with the platform API. In another embodiment, distinct registration protocols can be employed, such as the generation of API keys, which are utilized for the application to authenticate each API call. In a further embodiment, secure sockets layer and transport layer security (SSL/TLS) certificates are issued during the application registration, enabling the application to establish its identity in subsequent transactions. Alternatively, mutual TLS can be implemented, demanding both client and server to substantiate each other identity, thereby enhancing the security paradigm. Furthermore, an embodiment can utilize hash-based message authentication code (HMAC), wherein the application, upon registration, receives a secret key to create a hash of its messages, thereby preserving the integrity of the messages and confirming the application identity through cryptographic means.

In another embodiment, cloud platforms can offer proprietary authentication services that applications can integrate during the enrollment process, which includes automated credential rotation and integrated policy enforcement. Each embodiment delineates a method to authenticate the application identity, safeguarding the platform ecosystem and maintaining the sanctity of the cloud environment.

At 402, callbacks requisite for the application are stipulated. An embodiment of 402 stage can leverage interface definition languages, such as web services description language (WSDL) or OpenAPI specification (OAS), to codify the application callback interfaces and operational constructs.

At 403, the request aspect of the callback is characterized with a CTI code, accompanied by a congruent JSON schema. Here, alternative data structuring formats like XML schema definition (XSD) or YAML can also be employed to articulate the structure and types of data the application will dispatch and receive.

At 404, the response schema for the callback is demarcated, employing a CTI code and an analogous JSON schema.

At 405, the client instigates an API callback using the defined request format. The initiation can be invoked by user interaction or system events, and in another embodiment, a graphical user interface built with frameworks such as React or Angular is utilized, which in turn invokes the backend services via asynchronous calls.

At 406, the client-originated callback is routed to the API callback gateway (e.g. API callback gateway 214). In one embodiment, RESTful API principles can be applied to callback routing and communication operations. Another embodiment employs GraphQL, an API query language that enables clients to request precisely what they need, making the query language efficient for complex systems with numerous interrelated resources. In further embodiments, gRPC can be used for internal callback services communication within microservices architecture. gRPC offers the advantage of using HTTP/2 for transport, providing features like multiplexing and server push. Moreover, in a different embodiment, WebSockets can be incorporated to facilitate real-time bidirectional communication between the client and the server, thereby enhancing the responsiveness and interactivity of callback operations. In an additional embodiment, Message Queuing Telemetry Transport (MQTT) protocol can be adopted for its lightweight publish/subscribe messaging transport, which is suitable for environments with limited network bandwidth. In yet another embodiment, AMQP (Advanced Message Queuing Protocol) can be used, which provides robust message queuing capabilities, ensuring reliable communication between the cloud platform and the application. Each of these embodiments employs protocols that can address specific callback connectivity needs. These protocols can be selectively applied based on the requirements of the application and the cloud platform, ensuring an efficient and effective API callback connectivity schema.

At 407, the received callback is validated at the gateway 214 to confirm adherence to the declared structure. In an embodiment, XML or custom domain-specific languages (DSLs) can be utilized for declaratively defining and verifying data structure and format. Similar to JSON, XML or DSLs allow for a clear hierarchical structure that can be easily parsed and utilized by various systems.

Domain-specific languages are configured to a specific computational context, providing a syntax and semantics optimized for the particular application domain. DSL enables developers to describe the desired outcomes or behaviors in a manner that is intuitive within the domain, thereby improving productivity and reducing the likelihood of errors. By using DSLs, developers can focus on the high-level design and functionality of the UI, abstracting away the lower-level implementation details. Callback declarations allow for a clear specification against which the callbacks can be verified, ensuring that they conform to the predefined structures and behaviors required by the application.

Upon a failed verification at 408, the flow diverges to an error management routine at 410, which can be actualized using error handling techniques coded into the application to apprehend and document the anomalies, including optionally employing logging libraries or integrated monitoring tools.

Following successful verification at 408, the request is secured at 409, inclusive of authentication data, at the gateway 214. 409 can incorporate cryptographic practices, such as utilizing encryption algorithms, to ensure the confidentiality and integrity of the data as it transits to the callback handler 221.

At 411, the fortified request is conveyed to the specified callback handler. In an embodiment, the callback handler can be implemented as a microservice, potentially orchestrated by platforms such as Kubernetes, designed to perform specific operations defined by the callback.

At 412, the callback handler processes the request, wherein the actual business logic of the application is executed. The callback handler 221 response is relayed back to the gateway 214 at 413. At 414, the gateway 214 corroborates the callback handler response against the declared schema, ensuring the response veracity and structural consistency.

At 416, where the client is furnished with the validated response data, marking the completion of the callback operation. The client application assimilates the response, which can be enacted using frontend frameworks that dynamically manifest the user interface based on the received data.

The method exemplifies an embodiment of a secure, robust, and systematic approach to application integration within cloud infrastructures, to streamline and safeguard data transactions between cloud-based applications and ancillary services.

The invention claimed is:

1. A computer-implemented method for application integration within a cloud platform based on declarative callback configuration, the method comprising:

registering, at a vendor portal module of the cloud platform, an application to acquire a unique vendor identification and a unique application identification, wherein the registration includes transmitting application-specific information to be stored within a metadata database of the vendor portal;

declaring, at vendor portal module, a plurality of callbacks for the application, each callback being associated with at least one application event and comprising a callback type identifier (CTI) code and a corresponding data structure of the callback request and callback response, wherein the corresponding data structure defines an expected format of a callback response payload for the callback request, wherein the metadata database employs a structured schema for relationships between the plurality of callbacks for the application, the application, and at least one independent software vendor (ISV);

initiating, by a client module within the cloud platform, an application program interface (API) callback in response to a predetermined event, wherein the predetermined event is defined according to at least one framework library which converts cloud platform events to API callback requests;

forwarding, from the client module to an API callback gateway of the cloud platform, the API callback, wherein the API callback gateway is configured to route the API callback based on the CTI code to a designated callback handler within an ISV infrastructure;

verifying, at the API callback gateway, the API callback to ensure compliance with a predefined data structure and callback configuration;

encapsulating, at the API callback gateway, the API callback with metadata;

transmitting, from the API callback gateway to the designated callback handler at the ISV infrastructure, the encapsulated API callback, wherein the callback handler is configured to process the API request;

processing, by the callback handler, the encapsulated API callback to perform an operation associated with the at least one application event within the ISV infrastructure based on the CTI code and the encapsulated authentication data, by executing business logic of the application according to the operation;

sending, from the callback handler back to the API callback gateway, a response to the API callback;

validating, at the API callback gateway, the response from the callback handler against a JSON schema associated with the CTI code to confirm structural integrity and data accuracy; and providing, by the API callback gateway to the client module, verified response data from the ISV infrastructure, wherein the client module is adapted to utilize the verified data, thereby allowing a plurality of ISVs to specify and control data exchange requirements and protocols directly from the vendor portal module of the cloud platform.

2. The method of claim 1, further comprising invoking cloud platform API with the registered application to trigger API callback initiation.

3. The method of claim 1, wherein processing the callback at the callback handler further comprises requesting data from ISV data storage.

4. The method of claim 1, wherein the declaring data structure of the callback at the vendor portal is in the format of JSON or XML.

5. The method of claim 1, wherein encapsulating the API callback with authentication data is performed in accordance with security frameworks including OAuth, token-based authentication, or application-specific encryption mechanisms.

6. The method of claim 1, wherein the declaring of callbacks comprises only a callback request declaration for initiating actions within the ISV infrastructure or only a callback response declaration for receiving results of processed requests.

7. The method of claim 1, wherein the API callback is transferred to the API callback gateway or API callback handler according to a callback version encoded in the CTI code, allowing for the management and compatibility with different versions of the API callback structure.

8. The method of claim 1, wherein the predetermined event triggering the API callback is at least one of the client GUI interaction, application event, or cloud platform API request.

9. The method of claim 1, wherein the API callback gateway utilizes a load balancing mechanism to efficiently distribute incoming API callback requests to multiple callback handlers based on current load and performance metrics.

10. The method of claim 1, wherein the application is a first application and further comprising registering a second application, declaring a plurality of callbacks for the second application, and utilizing declared callbacks of the second application at the first application.

11. A system for application integration within a cloud platform environment, the system comprising:
  computing hardware comprising at least one processor;
  instructions that, when executed by the at least one processor, cause the at least one processor to implement:
    a vendor portal configured to register an application thereby acquiring unique vendor and application identifiers, and to store application-specific information within a metadata database;
    a client module within the cloud platform configured to initiate an API callback in response to a predetermined event, wherein the predetermined event is defined according to at least one framework library which converts cloud platform events to API callback requests;
    an API callback gateway configured to:
      receive the initiated API callback from the client module,
      verify the API callback for compliance with predefined data structures and callback configurations, wherein each predefined data structure defines an expected format of a callback response payload for the API callback request, wherein the metadata database employs a structured schema for relationships between a plurality of callbacks for the application, the application, and at least one independent software vendor (ISV);
      encapsulate the API callback with authentication data, and
      route the encapsulated API callback based on a callback type identifier to a designated callback handler within an ISV infrastructure;

a callback handler deployed within the ISV infrastructure configured to:
      process the received encapsulated API callback by executing business logic of the application, and
      send a structured response back to the API callback gateway; and
    wherein the API callback gateway is further configured to validate the structured response from the callback handler against a declared data structure and provide the validated response data to the client module, the client module further configured to utilize the validated response data according to the application, thereby allowing a plurality of ISVs to specify and control data exchange requirements and protocols directly from the vendor portal module of the cloud platform.

12. The system of claim 11, further comprising a cloud platform API configured to initiate the API callback using application identifier.

13. The system of claim 11, wherein the callback handler is further configured to request data from ISV data storage based on the application event.

14. The system of claim 11, wherein the data structure of the callback is in a format of JSON or XML.

15. The system of claim 11, wherein the encapsulation of the API callback with authentication data is performed in accordance with security frameworks including OAuth, token-based authentication, or application-specific encryption mechanisms.

16. The system of claim 11, wherein the declaring of callbacks at the vendor portal module comprises either exclusively a callback request declaration for initiating actions or exclusively a callback response declaration for receiving processed request results.

17. The system of claim 11, wherein the API callback gateway and the callback handler are configured to process and transfer the API callback in accordance with a callback version encoded in the CTI.

18. The system of claim 11, wherein the predetermined event is at least one of client GUI interactions, application events, or scheduled task notifications.

19. The system of claim 11, wherein the API callback gateway is further configured to employ load balancing mechanisms to distribute incoming API callback requests to callback handlers based on current load and performance metrics.

20. The system of claim 11, wherein the application is a first application and the vendor portal module is further configured to register a second application, declare callbacks for the second application, and facilitate the use of declared callbacks of the second application by the first application to support cross-application integration.

* * * * *